United States Patent
Zhong et al.

(10) Patent No.: US 8,325,724 B2
(45) Date of Patent: Dec. 4, 2012

(54) DATA REDISTRIBUTION IN DATA REPLICATION SYSTEMS

(75) Inventors: Hua Zhong, San Jose, CA (US); Dheer Moghe, Sunnyvale, CA (US); Sazzala Venkata Reddy, Sunnyvale, CA (US)

(73) Assignee: EMC Corporation, Hopkinton, MA (US)

( * ) Notice: Subject to any disclaimer, the term of this patent is extended or adjusted under 35 U.S.C. 154(b) by 303 days.

(21) Appl. No.: 12/384,210

(22) Filed: Mar. 31, 2009

(65) Prior Publication Data

US 2010/0246578 A1 Sep. 30, 2010

(51) Int. Cl.
*H04L 12/28* (2006.01)
(52) U.S. Cl. .................................. 370/390; 707/655
(58) Field of Classification Search ............. 370/254
See application file for complete search history.

(56) References Cited

U.S. PATENT DOCUMENTS

| | | | |
|---|---|---|---|
| 6,449,688 B1 * | 9/2002 | Peters et al. | 711/112 |
| 6,647,393 B1 | 11/2003 | Dietterich et al. | |
| 7,222,119 B1 | 5/2007 | Ghemawat et al. | |
| 2002/0133737 A1 * | 9/2002 | Novick | 714/5 |
| 2003/0188035 A1 * | 10/2003 | Lubbers et al. | 709/310 |
| 2004/0059805 A1 | 3/2004 | Dinker et al. | |
| 2005/0027817 A1 | 2/2005 | Novik et al. | |
| 2005/0172097 A1 * | 8/2005 | Voigt et al. | 711/170 |
| 2009/0113026 A1 * | 4/2009 | Nguyen et al. | 709/219 |
| 2010/0030730 A1 * | 2/2010 | Shang et al. | 707/2 |

* cited by examiner

*Primary Examiner* — Chirag Shah
*Assistant Examiner* — Jenkey Van
(74) *Attorney, Agent, or Firm* — Van Pelt, Yi & James LLP (57) ABSTRACT

A system includes one or more processors configured to redistribute one or more originator data subsets among a plurality of originator nodes and determine data redistribution information pertaining to redistribution of the one or more originator data subsets among the plurality of originator nodes. The system further includes a communication interface configured to send data redistribution information to a replica system. The data redistribution information is used by the replica system to redistribute one or more corresponding replica data subsets among a plurality of replica nodes.

16 Claims, 7 Drawing Sheets

DATA REDISTRIBUTION IN DATA REPLICATION SYSTEMS

BACKGROUND OF THE INVENTION

In many existing data replication systems, data is synchronized between an originator and a replica. Any change on the originator is sent to the replica and mirrored. Frequent data updates consume a lot of bandwidth and lead to inefficiency. The problem is particularly pronounced in environments where the originator and the replica are separated by a Wide Area Network (WAN) and where bandwidth is limited.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
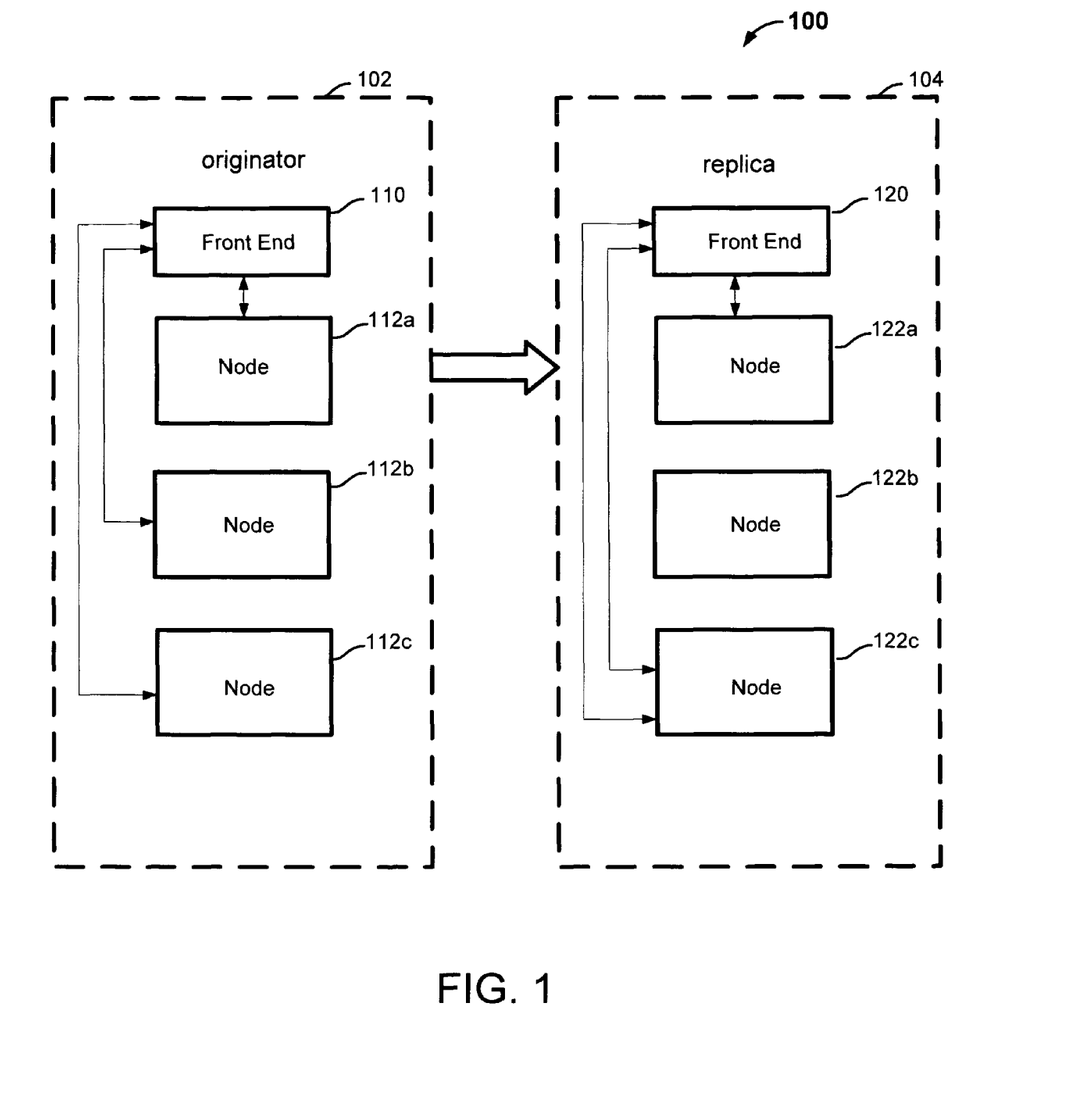
FIG. 1 is a block diagram illustrating an embodiment of a data replication environment.

FIG. 1 is a block diagram illustrating an embodiment of a data replication environment. In this example, data replication system 100 includes an originator system 102 (also referred to as the source system) and a replica system 104 (also referred to as the destination system). The systems are separated by one or more networks, such as a local area network or a wide area network.

The originator system includes an originator front end device 110 and a plurality of originator nodes 112a, 112b, and 112c (also referred to as originator back end devices). The replica system includes a replica front end device 120, and a plurality of replica nodes 122a, 122b, and 122c (also referred to as replica back end devices). Different number of nodes and different arrangements of front end device and nodes are possible. For example, the functions of a front end device and a node can be integrated into a single physical device.

The nodes are used to store data. In various embodiments, the nodes are implemented using any appropriate types of devices, such as storage devices or file servers that include storage components. The front end devices can also be implemented using a variety of devices, such as a general purpose server that runs data replication management software. Each front end device communicates with its respective nodes, coordinating data storage on the nodes to achieve a virtualized file system. In other words, to external devices that access data through the front end device, the front end device appears to be a file system server managing a single file system. In some embodiments, the front end and the back end nodes co-exist on one physical device with separate storage partitions.

As will be described in greater detail below, the originator and replica systems communicate with each other. More specifically, the originator system can send backup information to the replica front end device, including information regarding new data and information regarding distribution of existing data. Communication may take place between the front end devices, or directly between the nodes.

In some embodiments, a stream of backup data is received and processed by the front end device, and distributed to the originator nodes to be stored. In the example shown in FIG. 1, data on the replica is kept as a mirror image as the data on the originator. When new data becomes available, it is stored on the originator and duplicated on the replica. In systems such as 100 where the originator and the replica have identical node configuration, new data on a specific originator node is duplicated on a corresponding replica node (sometimes referred to as the "buddy"). For example, new data stored on node 112b is duplicated on buddy node 122b. In some embodiments, knowledge about nodes and their buddies is maintained on the front end device. Individual nodes may directly communicate with each other, and the originator node directly sends data that is to be duplicated to its buddy. Alternatively, an originator node communicates with the originator front end device, which in turn communicates with the replica front end device to transfer duplicated data to an appropriate replica node.

In some situations, existing data on the originator can move from one originator node to another originator node. For example, if data distribution becomes uneven, in other words, too much data is stored on certain nodes while too little data is stored on other nodes, the system will rebalance data distribution among the nodes. Another situation that results in data redistribution is when a new node is added to the system—data is redistributed from existing nodes to the new node. When data redistribution occurs, information pertaining to the redistributed data is sent from the originator to the replica so that data can be redistributed in the same way on the replica. The data itself, however, is not resent. Since copying replicated data to a new replica node then deleting the same data stored on an old replica node is no longer required, the overall system handles data redistribution efficiently.

Figure 2:
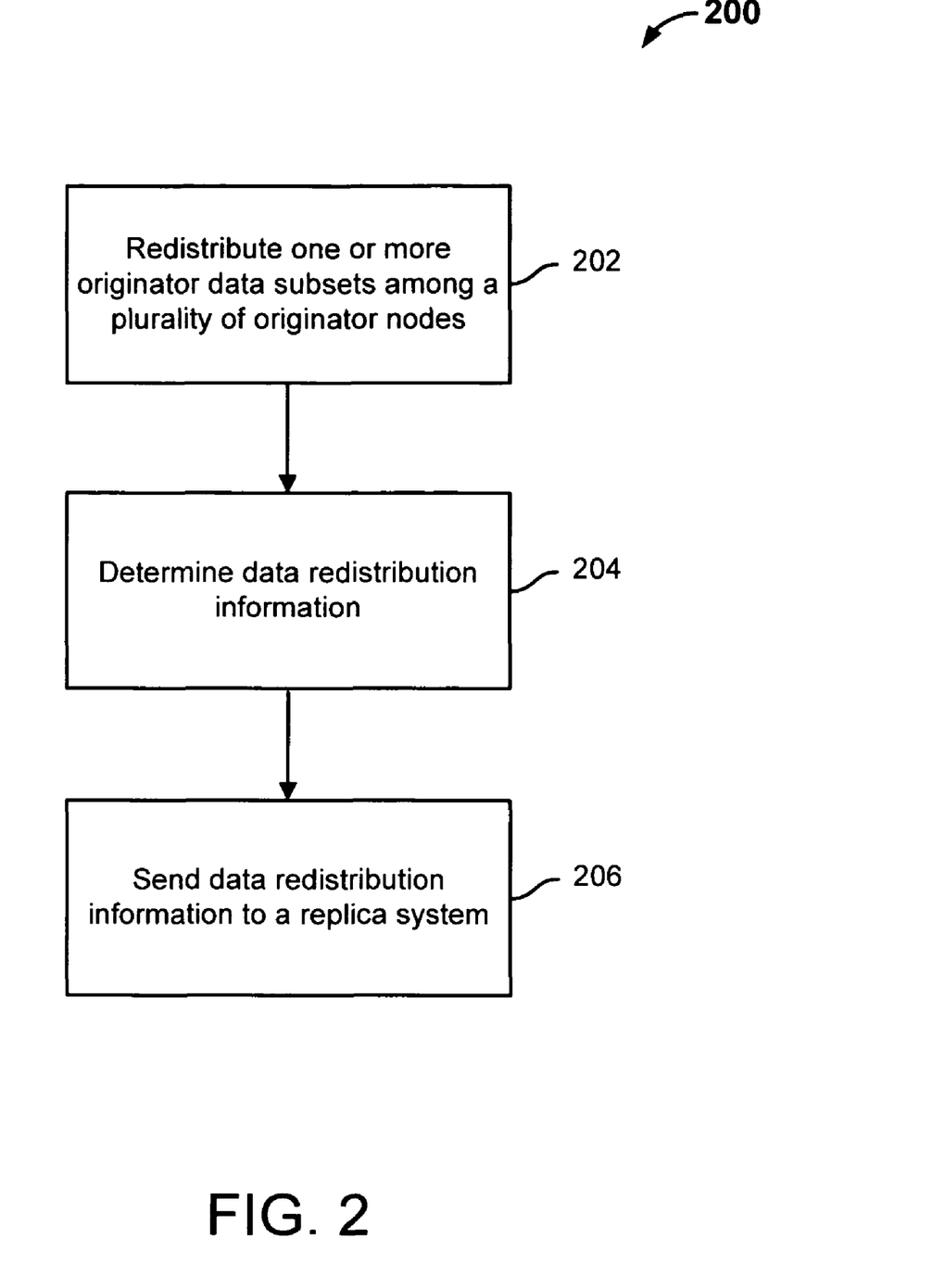
FIG. 2 is a flowchart illustrating an embodiment of a process for data replication.

FIG. 2 is a flowchart illustrating an embodiment of a process for data replication. In some embodiments, process 200 is carried out on an originator system such as 102. In some embodiments the process is implemented by front end device 110. At 202, one or more originator data subsets are redistributed among a plurality of originator nodes. In other words, the originator data subsets are moved from certain originator nodes to other originator nodes. Redistribution may occur when the system performs load balancing, a new node becomes added to the network, an existing node becomes deleted from the network, or for any other appropriate reasons. In some embodiments the data subsets are data containers, which are described in greater detail below. At 204, data redistribution information pertaining to how the data subsets are redistributed is determined. In some embodiments, the data redistribution information includes information pertaining to the source originator nodes from which the data subsets have been moved, and the destination originator nodes to which the originator data subsets are moved. At 206, the data distribution information is sent via a communication interface to a replica system, which uses the data redistribution information to redistribute corresponding replica data subsets among the replica nodes.

Figure 3:
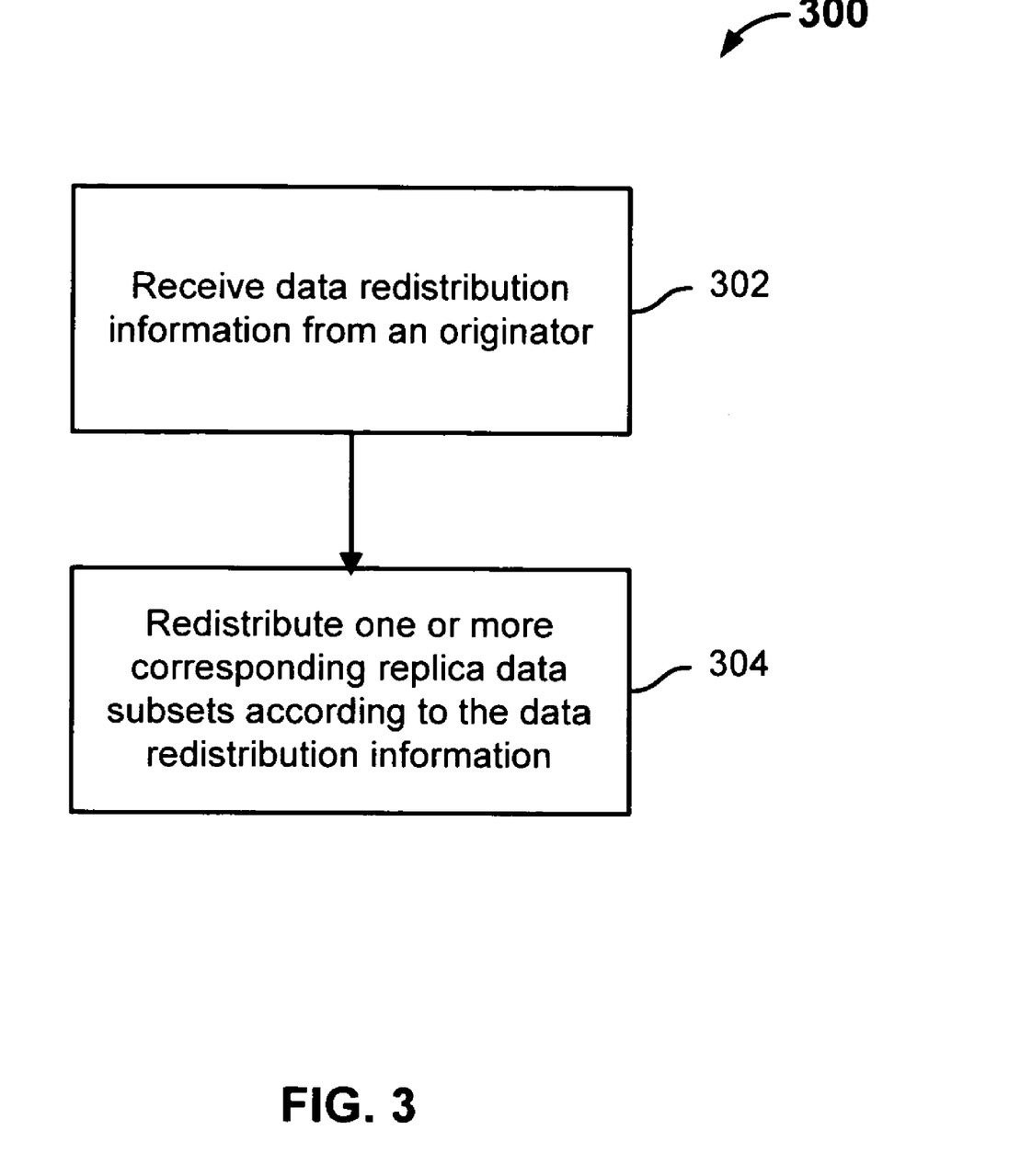
FIG. 3 is a flowchart illustrating another embodiment of a process for data replication.

FIG. 3 is a flowchart illustrating another embodiment of a process for data replication. In some embodiments, process 300 is carried out on a replica system such as 104. In some embodiments the process is implemented by front end device 120. At 302, data redistribution information is received from an originator. The data redistribution information may be sent from an originator implementing process 200. At 304, one or more corresponding replica data subsets are redistributed on the replica system according to the data redistribution information. As described previously, the data redistribution information includes information pertaining to the source nodes and the destination nodes associated with the redistributed data subsets. Assuming that each originator node has a corresponding buddy replica node, and that initially the same originator data subsets and replica data subsets are stored on the originator nodes and the corresponding replica nodes, respectively, and that the initial distribution of data subsets among the originator nodes is identical to the distribution among the replica nodes. Thus, given the data redistribution information, the replica system can redistribute its existing data subsets in the same way as the originator system, without incurring duplicative data transmission overhead.

Figure 4:
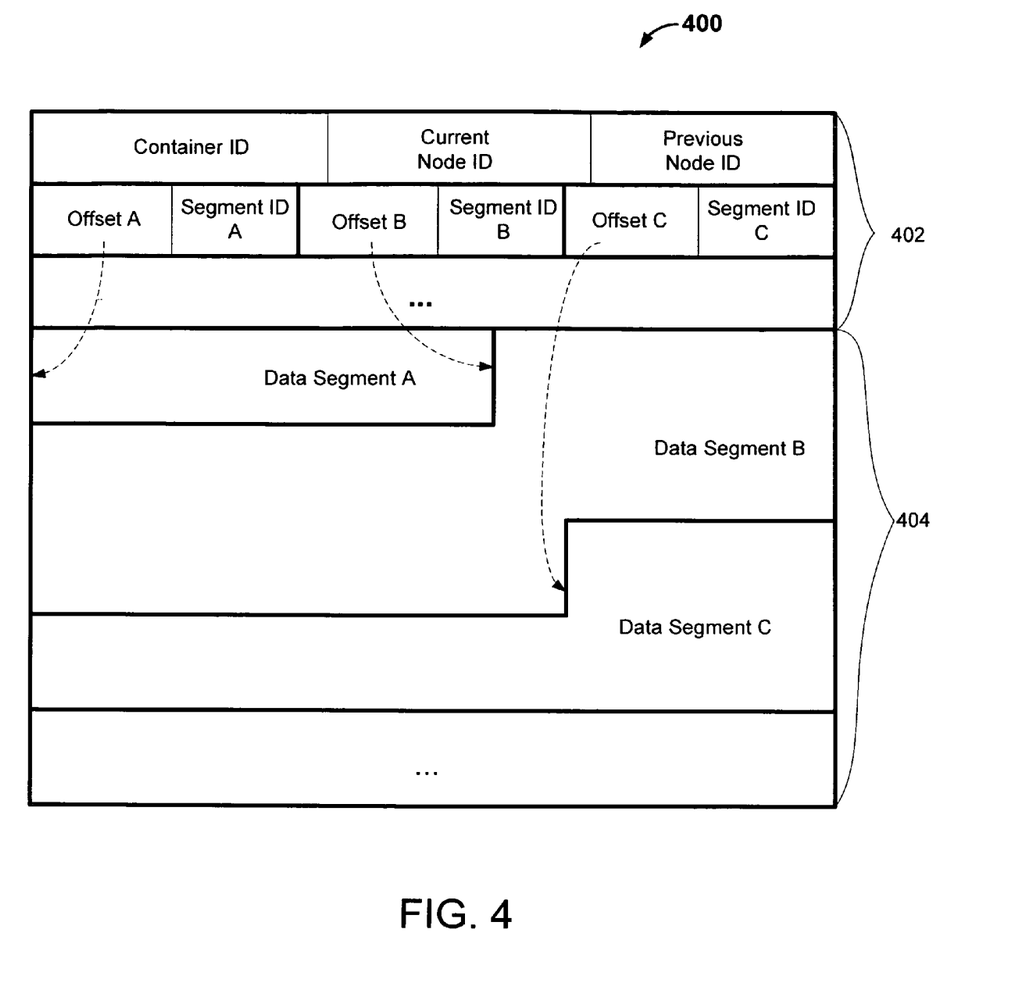
FIG. 4 is a data structure diagram illustrating an embodiment of a container.

In some embodiments, the data subsets used in the processes above are containers. In various embodiments, a container may be a few megabytes in size. For example, containers of 4.5 MB are used in some embodiments. A node may store a number of containers. FIG. 4 is a data structure diagram illustrating an embodiment of a container. In this example, container 400 includes a backup data portion 404 and a metadata portion 402. The backup data portion includes actual data that requires backup, and metadata portion includes information pertaining to the backup data portion that is used to facilitate data backup. The backup data portion includes a number of data segments, which are data storage subunits and which may be different in size. While data is received on the originator, for example while a data stream is read by the front end device, the data is divided into data segments and appropriate segment identifiers (IDs) are generated. The front end device also performs functions such as checking the data segments to verify that no duplicated segments are received. A record of how the data segments are arranged in the data stream so that the data stream may be reconstructed later is maintained on the front end device or stored in one or more nodes.

The data segments are packed into appropriate containers, and their corresponding offsets and segment IDs are recorded in the metadata portion. The metadata portion includes a number of offset/segment identifier (ID) pairs. An offset indicate the offset of the beginning of a data segment. The segment ID is used to identify a data segment. In some embodiments, a fingerprint or a modified fingerprint that uniquely identifies the data segment is used. Also included in the metadata portion are a container ID for identifying this container, a current node ID for identifying the node on which the container currently resides (i.e., the destination node to which the container is moved), and a previous node ID for identifying the node on which the container previously resided (i.e., the source node from which the container was moved). The container ID, current node ID, and previous node ID are used to facilitate the container redistribution process during replication in some embodiments.

Figure 5A:
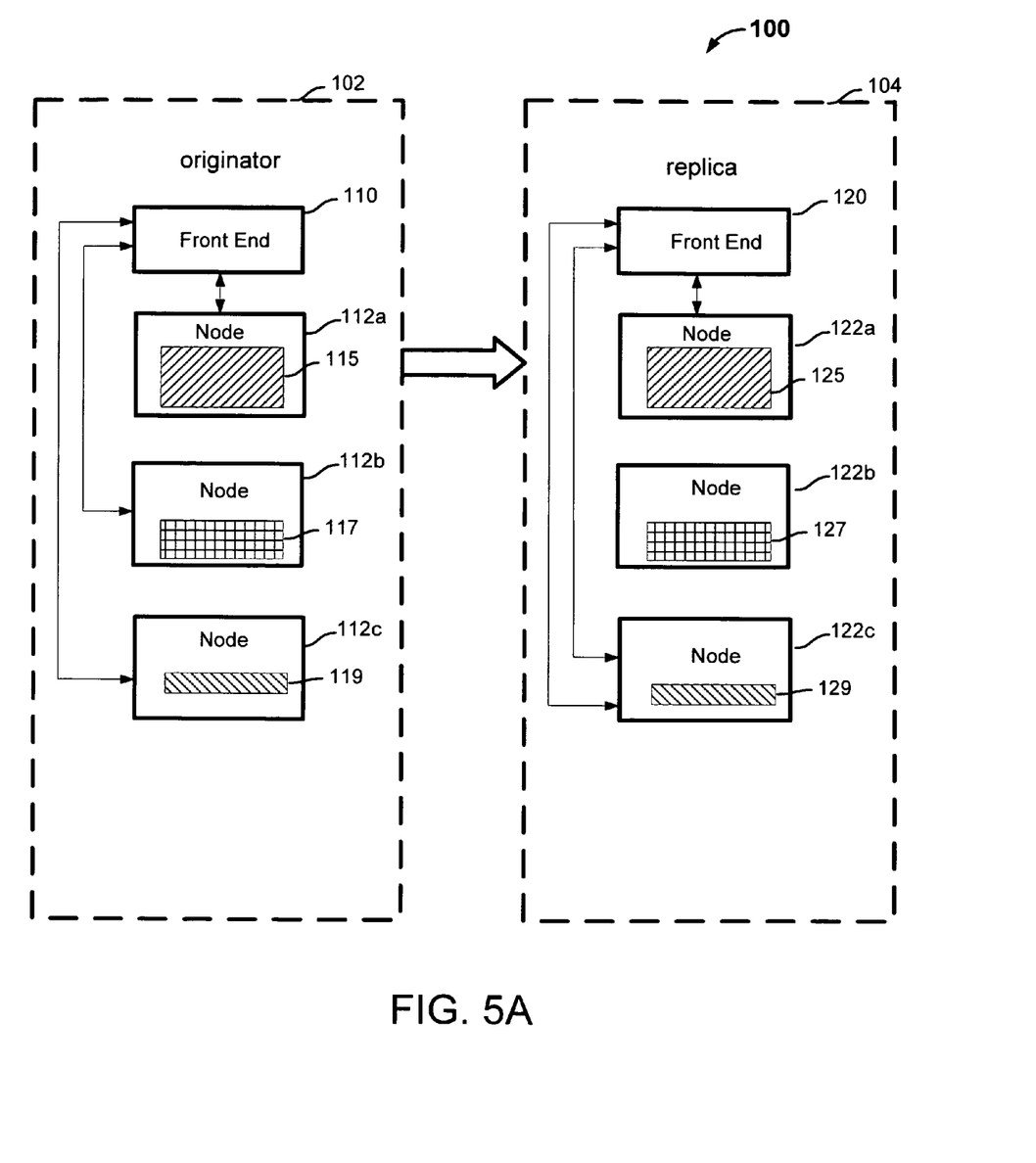
FIGS. 5A-5C are a series of diagrams illustrating an example scenario in which data is redistributed.
Figure 5B:
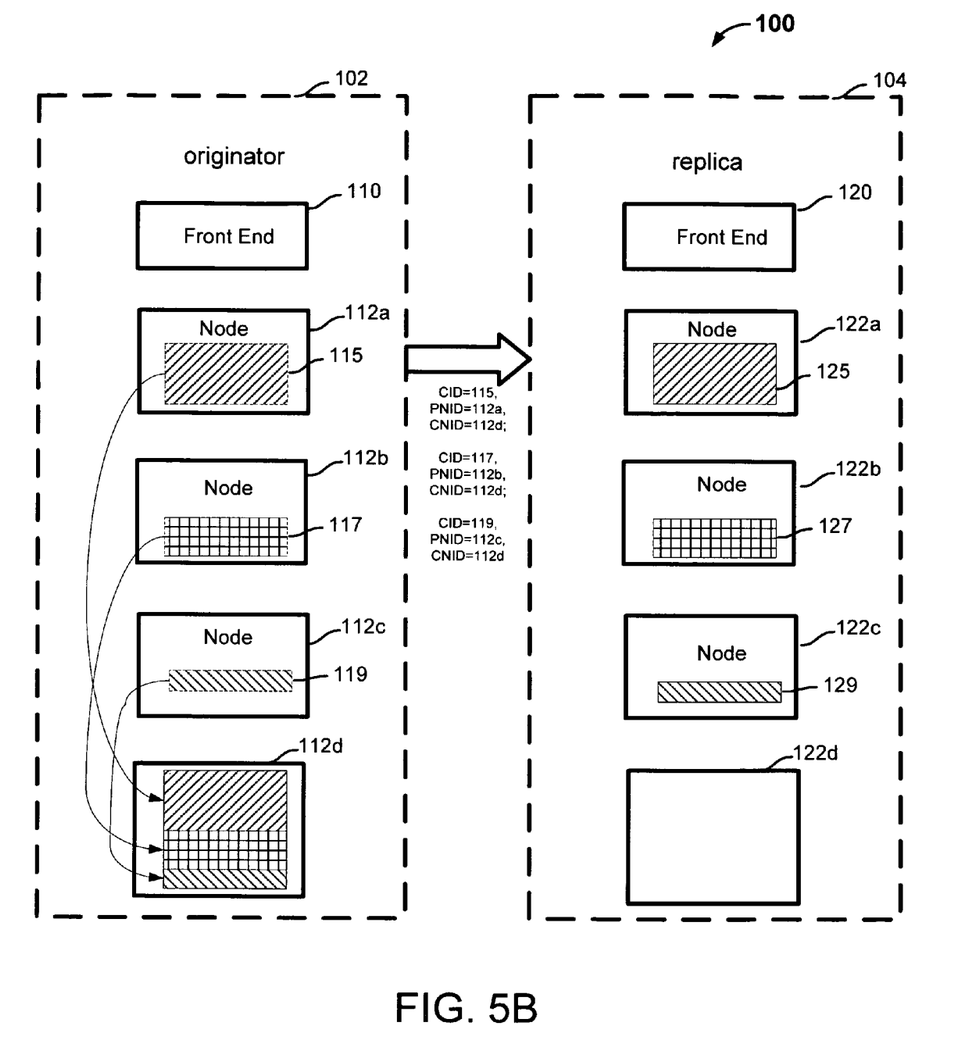
Figure 5C:
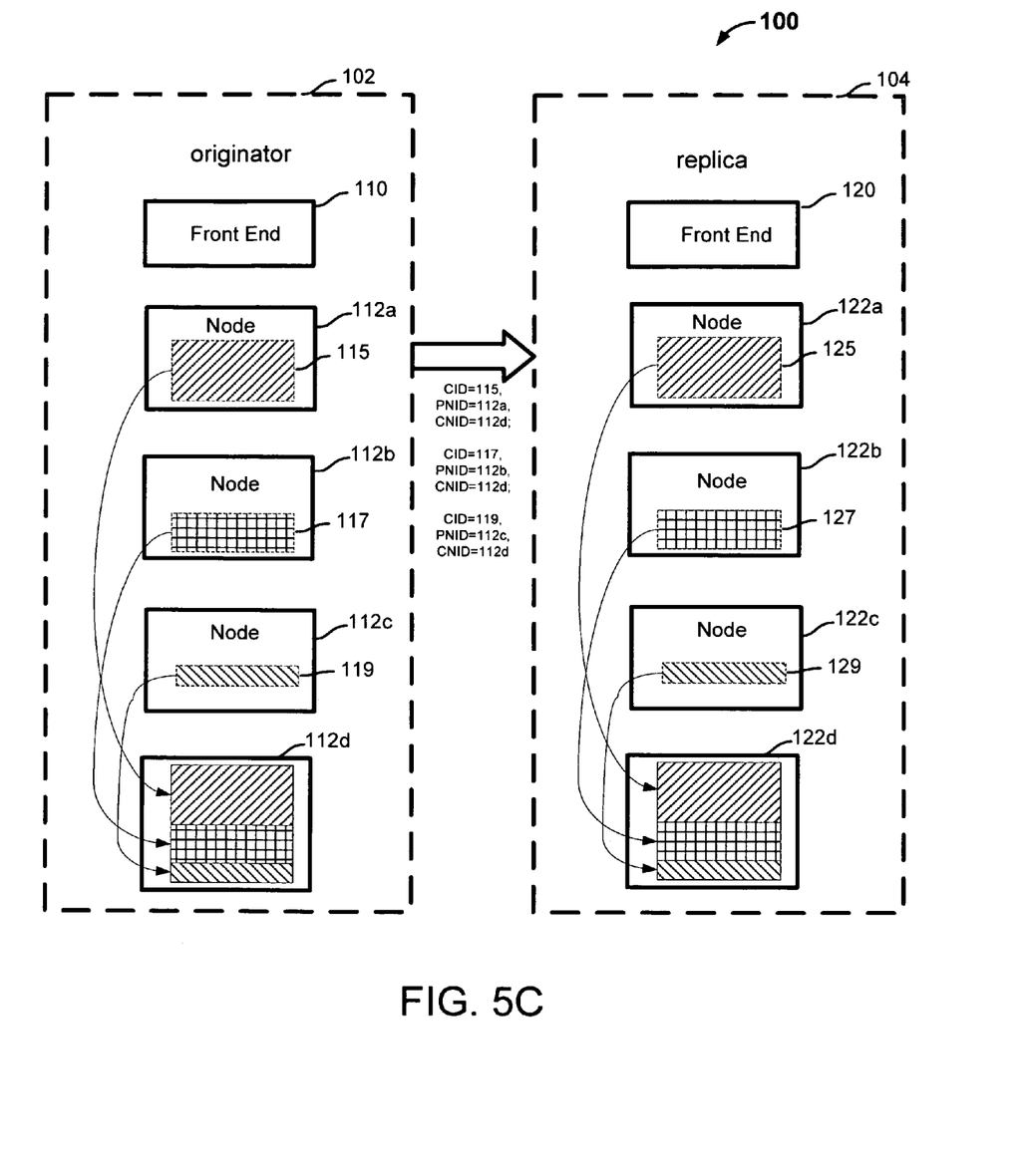

FIGS. 5A-5C are a series of diagrams illustrating an example scenario in which data is redistributed as a result of new nodes being added to the system. In FIG. 5A, data replication system 100 is configured to include an originator system 102 and a replica system 104. On the originator system, data containers 115, 117, and 119 are distributed on originator nodes 112a, 112b, and 112c, respectively. Each node further includes additional containers that are not shown in the diagram. On the replica system which mirrors the originator system, corresponding replicated data containers 125, 127, and 129 are distributed on replica nodes 122a, 122b, and 122c. These replica containers were copied from the originator previously. Although originator components such as the front end device, nodes, and data containers in the originator system are shown to have different labels/IDs than the ones in the replica system in this example, in some embodiments an originator component and its corresponding counterpart on the replica share the same identifier. Various identification schemes can be used so long as the replica system is able to associate an originator component with its counterpart on the replica.

In FIG. 5B, a new node 112d is added to the originator system and a corresponding new node 122d is also added to the replica system. Thus, data stored on the originator and replica systems should be rebalanced. A process such as 200 takes place on originator system 102 in this example. Specifically, on the originator system, containers 115, 117 and 119 are redistributed. Rather than resending these containers to the replica, data distribution information is determined. In this case, containers 115, 117 and 119 have been moved to new node 112d. Thus, data redistribution information is sent to the replica system. In this case, the data redistribution information includes a compact set of metadata information pertaining to the containers that are redistributed, including IDs of the containers, IDs of the respective nodes on which the containers previously resided, and IDs of the current nodes to which the containers are redistributed and on which the containers currently reside. Actual backup data such as data segments in the containers is not sent in this example and bandwidth is conserved.

In FIG. 5C, a process such as 300 takes place on replica system 104 in this example. Upon receiving the data redistribution information from the originator system, data containers on the replica systems are redistributed according to the data redistribution information. In this example, front end device 120 receives and parses the redistribution information, and coordinates with the replica nodes to redistribute the data containers in the same way the corresponding containers are redistributed on the originator. Based on the data redistribution given, data containers 125, 127, and 129 (which correspond to containers 115, 117, and 119, respectively) are moved to new node 122*d*.

The above process may also be carried out in response to load balancing. In one example, nodes 112*a-c* and 122*a-c* are existing nodes, and nodes 112*d* and 122*d* are also existing nodes rather than newly added nodes. It is determined that too much data is stored on nodes 112*a*, 112*b* and 112*c* and not enough data is stored on nodes 112*d* and 122*d*. Thus, a process similar to what is described in FIGS. 5A-5C is carried out to redistribute data and balance the amount of data stored on various nodes. By using data redistribution information, data containers do not have to be sent across the network and load balancing can be achieved quickly and efficiently.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system comprising:
    one or more processors configured to:
    redistribute one or more originator data subsets among a plurality of originator nodes, wherein the one or more originator data subsets were initially distributed among the plurality of originator nodes according to an initial distribution arrangement, and redistributing the one or more originator data subsets changes the initial distribution arrangement of the original data subsets to a new distribution arrangement; and
    determine data redistribution information pertaining to redistribution of the one or more originator data subsets among the plurality of originator nodes; and
    a communication interface configured to send data redistribution information pertaining to redistribution of the one or more originator data subsets among the plurality of originator nodes to a replica system comprising a plurality of replica nodes; wherein:
    the one or more originator data subsets were previously replicated on the replica system as one or more corresponding replica data subsets among the plurality of replica nodes;
    the data redistribution information is used by the replica system to redistribute one or more corresponding replica data subsets among the plurality of replica nodes;
    the one or more originator data subsets include one or more data containers;
    the data redistribution information includes metadata information associated with the one or more data containers; and
    the metadata information including identification information of the one or more data containers, identification information of one or more originator nodes on which the one or more data containers previously resided, and identification information of one or more current nodes to which the containers are redistributed; and
    the one or more corresponding replica data subsets are redistributed among the plurality of replica nodes without requiring the one or more originator data subsets to be sent to the replica system during redistribution.

2. The system of claim 1, wherein the data redistribution information includes identification information of one or more previous originator nodes from which the one or more data subsets have been moved, and identification information of one or more current originator nodes on which the originator data subsets currently reside.

3. The system of claim 1, wherein the redistribution information includes metadata associated with the one or more data containers, and each of the one or more data containers includes one or more data segments.

4. The system of claim 1, wherein the one or more originator data subsets and the one or more replica data subsets include identical backup data.

5. The system of claim 1, wherein the plurality of originator nodes are included in a file system.

6. The system of claim 1, wherein the data redistribution information does not include backup data.

7. The system of claim 1, wherein the one or more originator data subsets are redistributed from one or more existing nodes to a newly added node.

8. The system of claim 1, wherein the one or more originator data subsets are redistributed to rebalance load on the plurality of originator nodes.

9. A method for data replication, comprising:
    redistributing one or more originator data subsets among a plurality of originator nodes, wherein the one or more originator data subsets were initially distributed among the plurality of originator nodes according to an initial distribution arrangement, and redistributing the one or more originator data subsets changes the initial distribution arrangement of the original data subsets to a new distribution arrangement; and
    determining data redistribution information pertaining to redistribution of the one or more originator data subsets among the plurality of originator nodes; and
    sending data redistribution information pertaining to redistribution of the one or more originator data subsets among the plurality of originator nodes to a replica system comprising a plurality of replica nodes; wherein:
    the one or more originator data subsets were previously replicated on the replica system as one or more corresponding replica data subsets among the plurality of replica nodes;
    the data redistribution information is used by the replica system to redistribute one or more corresponding replica data subsets among a plurality of replica nodes;
    the one or more originator data subsets include one or more data containers;
    the data redistribution information includes metadata information associated with the one or more data containers; and
    the metadata information including identification information of the one or more data containers, identification information of one or more originator nodes on which the one or more data containers previously resided, and identification information of one or more current nodes to which the containers are redistributed; and
    the one or more corresponding replica data subsets are redistributed among the plurality of replica nodes without requiring the one or more originator data subsets to be sent to the replica system during redistribution.

10. The method of claim 9, wherein the data redistribution information includes identification information of one or more previous originator nodes from which the one or more data subsets have been moved, and identification information of one or more current originator nodes on which the originator data subsets currently reside.

11. The method of claim 9, wherein the redistribution information includes metadata associated with the one or more data containers, and each of the one or more data containers includes one or more data segments.

12. The method of claim 9, wherein the one or more originator data subsets and the one or more replica data subsets include identical backup data.

13. A computer program product for data replication, the computer program product being embodied in a non-transitory computer readable storage medium and comprising computer instructions for:
  redistributing one or more originator data subsets among a plurality of originator nodes, wherein the one or more originator data subsets were initially distributed among the plurality of originator nodes according to an initial distribution arrangement, and redistributing the one or more originator data subsets changes the initial distribution arrangement of the original data subsets to a new distribution arrangement; and
  determining data redistribution information pertaining to redistribution of the one or more originator data subsets among the plurality of originator nodes; and
  sending data redistribution information pertaining to redistribution of the one or more originator data subsets among the plurality of originator nodes to a replica system comprising a plurality of replica nodes; wherein:
  the one or more originator data subsets were previously replicated on the replica system as one or more corresponding replica data subsets among the plurality of replica nodes;
  the data redistribution information is used by the replica system to redistribute one or more corresponding replica data subsets among a plurality of replica nodes;
  the one or more originator data subsets include one or more data containers;
  the data redistribution information includes metadata information associated with the one or more data containers; and
  the metadata information including identification information of the one or more data containers, identification information of one or more originator nodes on which the one or more data containers previously resided, and identification information of one or more current nodes to which the containers are redistributed; and
  the one or more corresponding replica data subsets are redistributed among the plurality of replica nodes without requiring the one or more originator data subsets to be sent to the replica system during redistribution.

14. A system comprising:
  an interface configured to receive data redistribution information from an originator system, the data redistribution information pertaining to redistribution of the one or more originator data subsets among a plurality of originator nodes; and
  one or more processors configured to redistribute one or more corresponding replica data subsets among a plurality of replica nodes according to the data redistribution information;
  wherein:
  the one or more originator data subsets were previously replicated on the system as the one or more corresponding replica data subsets among the plurality of replica nodes;
  the one or more replica data subsets were initially distributed among the plurality of replica nodes according to an initial distribution arrangement;
  redistributing the one or more replica data subsets among the plurality of replica nodes according to the data redistribution information changes the initial distribution arrangement of the replica data subsets to a new distribution arrangement;
  the one or more originator data subsets include one or more data containers;
  the data redistribution information includes metadata information associated with the one or more data containers; and
  the metadata information including identification information of the one or more data containers, identification information of one or more originator nodes on which the one or more data containers previously resided, and identification information of one or more current nodes to which the containers are redistributed; and
  the one or more replica data subsets are redistributed among the plurality of replica nodes without requiring the one or more originator data subsets to be sent to the replica system during redistribution.

15. A method for data replication, comprising:
  receiving data redistribution information from an originator system, the data redistribution information pertaining to redistribution of the one or more originator data subsets among a plurality of originator nodes; and redistributing one or more corresponding replica data subsets among a plurality of replica nodes according to the data redistribution information;
  wherein:
  the one or more originator data subsets were previously replicated on the system as one or more corresponding replica data subsets among the plurality of replica nodes;
  the one or more replica data subsets were initially distributed among the plurality of replica nodes according to an initial distribution arrangement;
  redistributing the one or more replica data subsets among the plurality of replica nodes according to the data redistribution information changes the initial distribution arrangement of the replica data subsets to a new distribution arrangement;
  the one or more originator data subsets include one or more data containers;
  the data redistribution information includes metadata information associated with the one or more data containers; and
  the metadata information including identification information of the one or more data containers, identification information of one or more originator nodes on which the one or more data containers previously resided, and identification information of one or more current nodes to which the containers are redistributed; and
  the one or more corresponding replica data subsets are redistributed among the plurality of replica nodes without requiring the one or more originator data subsets to be sent to the replica system during redistribution.

16. A computer program product for data replication, the computer program product being embodied in a non-transitory computer readable storage medium and comprising computer instructions for:
  receiving data redistribution information from an originator system, the data redistribution information pertaining to redistribution of the one or more originator data subsets among a plurality of originator nodes; and
  redistributing one or more corresponding replica data subsets among a plurality of replica nodes according to the data redistribution information;
  wherein:
  the one or more originator data subsets were previously replicated on the replica system as one or more corresponding replica data subsets among the plurality of replica nodes;

the one or more replica data subsets were initially distributed among the plurality of replica nodes according to an initial distribution arrangement;

redistributing the one or more replica data subsets among the plurality of replica nodes according to the data redistribution information changes the initial distribution arrangement of the replica data subsets to a new distribution arrangement;

the one or more originator data subsets include one or more data containers;

the data redistribution information includes metadata information associated with the one or more data containers; and the metadata information including identification information of the one or more data containers, identification information of one or more originator nodes on which the one or more data containers previously resided, and identification information of one or more current nodes to which the containers are redistributed; and the one or more replica data subsets are redistributed among the plurality of replica nodes without requiring the one or more originator data subsets to be sent to the replica system during redistribution.

* * * * *